United States Patent [19]

Bardy

[11] Patent Number: 5,453,238
[45] Date of Patent: Sep. 26, 1995

[54] EXTRUSION APPARATUS AND METHOD OF EXTRUSION FOR RAW RUBBER MIXES

[75] Inventor: Daniel Bardy, Clermont-Ferrand, France

[73] Assignee: Compagnie Generale des Etablissements Michelin - Michelin & Cie, Clermont-Ferrand Cedex, France

[21] Appl. No.: 176,099

[22] Filed: Dec. 30, 1993

[30] Foreign Application Priority Data

Jan. 8, 1993 [FR] France ................... 93 00192

[51] Int. Cl.⁶ ................... B29C 47/06; B29C 47/32
[52] U.S. Cl. ............... 264/174.11; 264/175; 264/177.1; 264/210.1; 264/349; 425/131.1; 425/145; 425/327; 425/363
[58] Field of Search ................. 264/171, 175, 264/177.1, 210.1, 349; 425/133.5, 131.1, 325, 327, 363, 145, 149, 194

[56] References Cited

U.S. PATENT DOCUMENTS 2,382,177  5/1992  Schanz .
3,142,091  7/1964  Curtiss ........................ 425/327
4,539,169  9/1985  Nixon et al. .
4,963,309  10/1990  Gohlisch et al. ................ 425/325
5,061,166  10/1991  Gohlisch et al. ................ 425/133.5
5,122,049  6/1992  Baumgarten .
5,234,647  8/1993  Harada et al. ................... 264/175
5,242,290  9/1993  Hiraiwa et al. .................. 264/171

FOREIGN PATENT DOCUMENTS 0484868  5/1992  European Pat. Off. .
1479111  5/1969  Germany .

OTHER PUBLICATIONS

Plastiques Elastomeres, vol. 31, No. 5, Juin 1979, Paris, pp. 79–81 'Une filiere pour graver en entrudant'.

Primary Examiner—Mathieu D. Vargot
Attorney, Agent, or Firm—Brumbaugh, Graves, Donohue & Raymond

[57] ABSTRACT

The extrusion apparatus proposed effects an extrusion of the roller-spout type onto a cylindrical roller 7 associated with a profiled fixed wall 5 and a second extrusion of the roller die type onto a profiled roller 8 and an associated fixed wall 6, and then superimposes the extrusions in the passage between the rollers 7 and 8.

9 Claims, 4 Drawing Sheets

EXTRUSION APPARATUS AND METHOD OF EXTRUSION FOR RAW RUBBER MIXES

BACKGROUND OF THE INVENTION

The present invention relates to the extrusion of rubber products. More precisely, it relates to the manufacture of a composite profiled product formed of rubber mixes of different composition.

For the extrusion of raw rubber, the state of the art includes a type of apparatus known as a roller die extruder. It makes it possible to extrude a product of great length, the profile of which is constant. This profile, that is to say, the cross section of the extruded rubber product, is defined in this type of apparatus by, on the one hand, the roller onto which the rubber is extruded and, on the other hand, a fixed wall which cooperates with the roller in order to define an extrusion orifice.

Furthermore, the manufacture of tires requires at present the production of profiled semifinished products which are formed of rubber mixes having different properties, referred herein generally as "composite product". Thus, for example, it is necessary to produce a tread having a cross section which has a shape which approaches that which the tread will have when the tire is molded, and which is formed of mixes of different composition depending on the transverse location in the future tire. A roller die co-extrusion apparatus which produces a co-extrusion product by extruding each of the rubber mixes onto a different place on the surface of the roller so as progressively to form the profiled co-extrusion product is known from U.S. Pat. No. 4,539,169.

Another co-extrusion technique which makes it possible to manufacture a composite product is described in U.S. Pat. No. 2,382,177 in which a first mix is profiled by forcing it between two fixed walls, a second mix is profiled by creating a bead of rubber between a fixed wall and a movable wall, and the first mix is brought onto the second mix in the space between two rollers.

It is desired to manufacture tires in constantly more precise fashion. The precision of manufacture depends, in particular, on respect for the dimensions of the rubber products the assembling of which forms the tire. In other words, when a composite product is used upon the assembling of the tire, it is very important that the line or lines of separation between the rubber mixes of different composition be geometrically strictly respected. Now, it is known that the mechanical properties of rubber mixes are very poor before the vulcanizing of these mixes. In certain cases, the raw rubber mix is in the form of an extremely soft paste, while other rubber mixes may be relatively hard, even before vulcanization. When it is attempted to co-extrude a very soft rubber mix at the same time as a very hard rubber mix, it is difficult to control with perfection the geometry of the surface of separation between the two mixes of very different properties.

Despite the difficulties encountered, it is desirable to use composite products upon the assembling of the tire since this decreases the number of layings of products which it is necessary to effect during the stage of the assembling on the drum. Now, the number of different rubber mixes used to produce a single tire is tending to increase in order to be able to optimize the properties of these mixes as a function of the region of the tire in which they are located.

SUMMARY OF THE INVENTION

The object of the present invention is to propose an apparatus and a method of extrusion which makes it possible to manufacture a profiled product formed of rubber mixes of different compositions and which is capable of strictly respecting the position of the lines of separation between the different rubber products which it is desired to obtain.

In accordance with the invention, the extrusion apparatus for the production of a product formed of different raw rubber mixes, comprising a first rotary roller and at least one other rotary roller which is profiled, the profiled roller being arranged adjacent to the first roller, the axes of rotation of the rollers being parallel so as to define between the rollers a passage section for the rubber, and comprising means making it possible to convey the different mixes into said passage section, is characterized by the fact that the said means comprise a first extruder which delivers a rubber mix through an extrusion orifice comprising a fixed wall cooperating with said first rotary roller so as to define the profile of the first mix, and by the fact that it comprises a second extruder which delivers a second rubber mix through an extrusion orifice comprising a fixed wall cooperating with the said profiled rotary roller in order to define the profile of the second rubber mix, the final profiled product being formed by the superposing of the mixes upon their passage between the rollers.

Screw extruders are preferably employed. The invention makes it possible to apply the regulation both to the speed of the screws which propel the rubber mix to the outside of the extruders and to the speed of the two rollers. By acting separately on all these speeds, it is possible perfectly to maintain the line of separation between mixes of very different properties. In most industrial applications, not more than two mixes of different composition are extruded simultaneously, which makes the invention of great interest.

The first roller is preferably cylindrical. In general, it is always possible, whatever the profile of the composite product to be manufactured, to transform it into a profile which includes a straight line which can result from extrusion on a cylindrical surface. The composite will then assume, as a result of plastic deformation, the actual final shape, which may be slightly different. This plastic deformation takes place, for example, upon the assembling of a tire by the winding of the composite on a drum.

The invention also proposes a method of extrusion for the formation of a profiled composite product consisting of at least two different rubber mixes arranged on opposite sides of at least one line of separation, the method including applying onto a first roller in rotation a first product having a profile which includes the said line of separation, applying onto a second profiled roller rotating in opposite direction a second product having a profile including the said line of separation, said second roller being arranged adjacent the first roller so as to define between the rollers a passage having a given profile, said passage being spaced downstream from the places where the first and second products are applied, to their respective rollers, so that the first product and the second product are superimposed along said line of separation, in the passage between said rollers, when they are driven into it there by the rotation of the said rollers.

The first roller is preferably cylindrical, which simplifies the use of this process.

DESCRIPTION OF THE DRAWINGS

The following description will make it possible clearly to understand the operation of the present invention by reading it in conjunction with the accompanying figures.

DESCRIPTION OF PREFERRED EMBODIMENTS

In the present description, the "profile" of a product means the course of the cross section of this product seen in a plane perpendicular to its greatest length, whether this be on the final product or on the partial product corresponding to a phase of the manufacture of a composite product. A product is referred to as "composite" when it is made from at least two rubber mixes of different composition. Finally, when the profile of a tool is mentioned, there is meant the shape of the orifice through which the rubber is extruded. In the case of a profiled roller, the profile is the shape of a radial section through this roller. In the case of a fixed wall, the profile is the shape of the cross section formed by a plane perpendicular to the direction of flow of the rubber.

Figure 1:
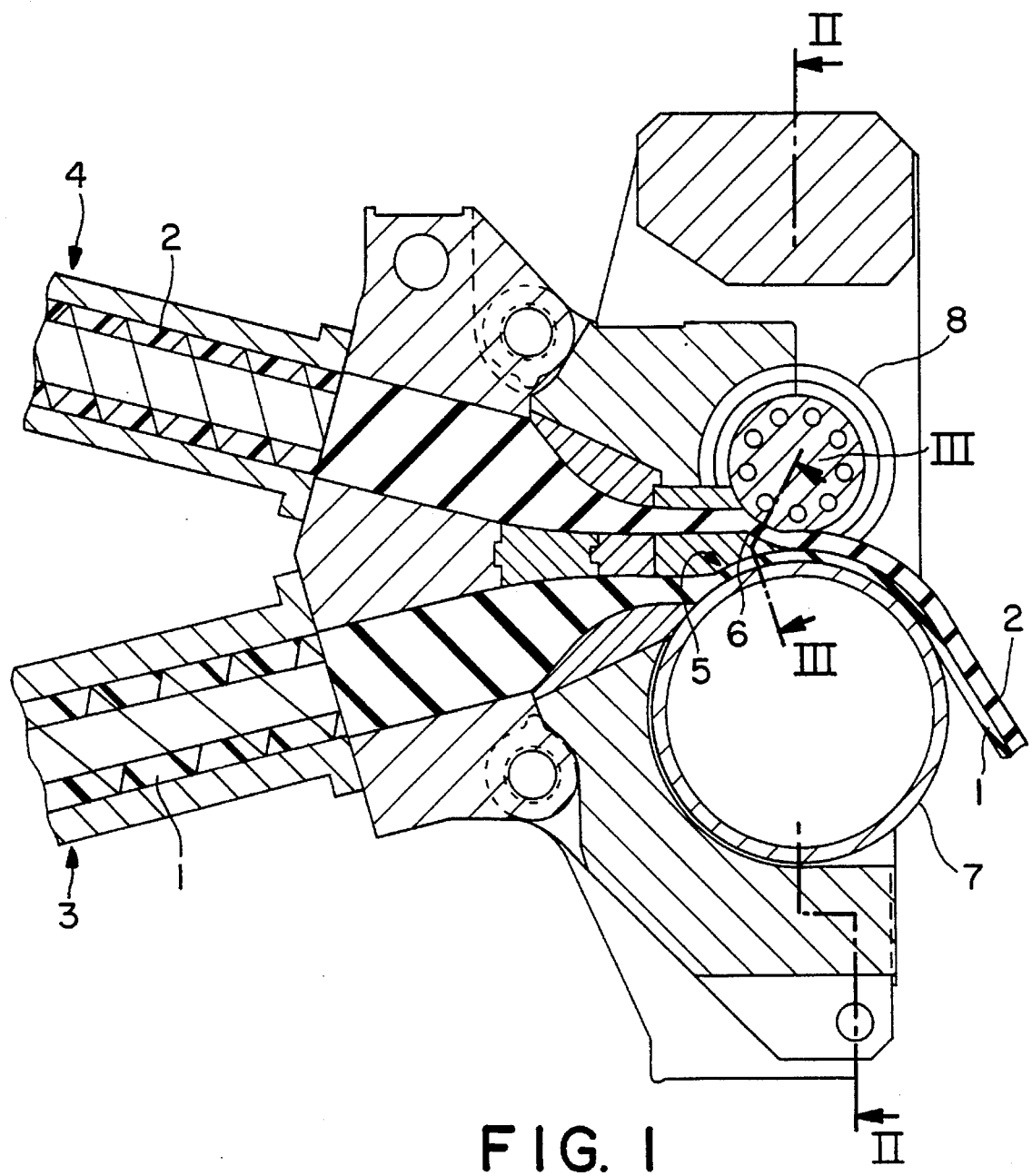
FIG. 1 is a sectional view through one embodiment of the extrusion apparatus along the line I—I of FIG. 2.

FIG. 1 shows an extruder 3 which delivers a first rubber mix 1 and an extruder 4 delivering a second rubber mix 2. A cylindrical roller 7 can also be noted. A roller is termed cylindrical when the surface of the roller is perfectly cylindrical. Therefore the same roller 7 is used, whatever the shape of the profile which it is desired to produce with the mix 1. As is well known in roller die extruders, the desired profile for the mix 1 is obtained by suitably selecting the shape of the fixed wall 5 associated with the roller 7 in order to define an extrusion orifice 9.

Figure 3:
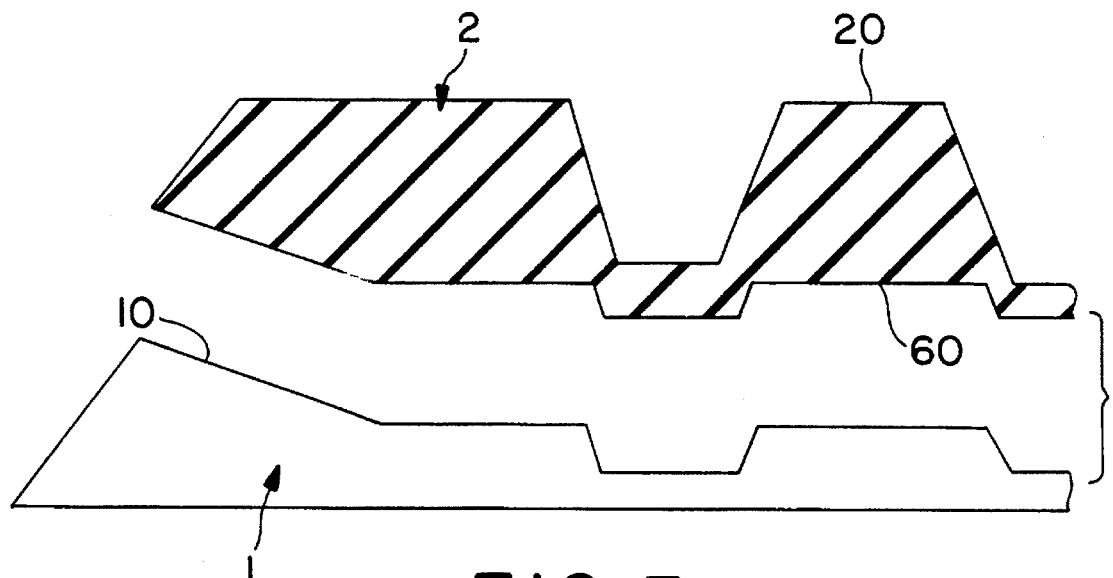
FIG. 3 is a section through the rubber products such as shown at III—III in FIG. 1.

In FIG. 3, the upper part 10 of the profile of the mix 1 is the image of the profile of the fixed wall 5.

The apparatus comprises a second roller 8 the axis of rotation of which is parallel to the axis of rotation of the first roller 7. The two rollers 7 and 8 rotate in opposite directions and are arranged adjacent each other, defining a passage 78 between them. The roller 8 is profiled. It is as a result of the shape of the outer surface of the profiled roller 8 that the overall profile desired is impressed upon the extruded rubber. The profiled roller 8 is therefore a tool which is changed whenever profiled products are changed.

In FIG. 3, the upper part 20 of the profile of the mix 2 is the image of the shape of the profiled roller 8.

The second extruder 4 delivers a rubber mix 2 which is different from the mix 1. This mix 2 is applied onto the profiled roller 8 upstream of the passage 78 and is itself profiled by the fixed wall 6.

In FIG. 3, the lower part 60 of the profile of the mix 2 is the image of the shape of the fixed wall 6. It is seen that the profile of the fixed wall which cooperates with the profiled roller is of a shape complementary to the profile of the fixed wall 5 which cooperates with the cylindrical roller 7.

Figure 2:
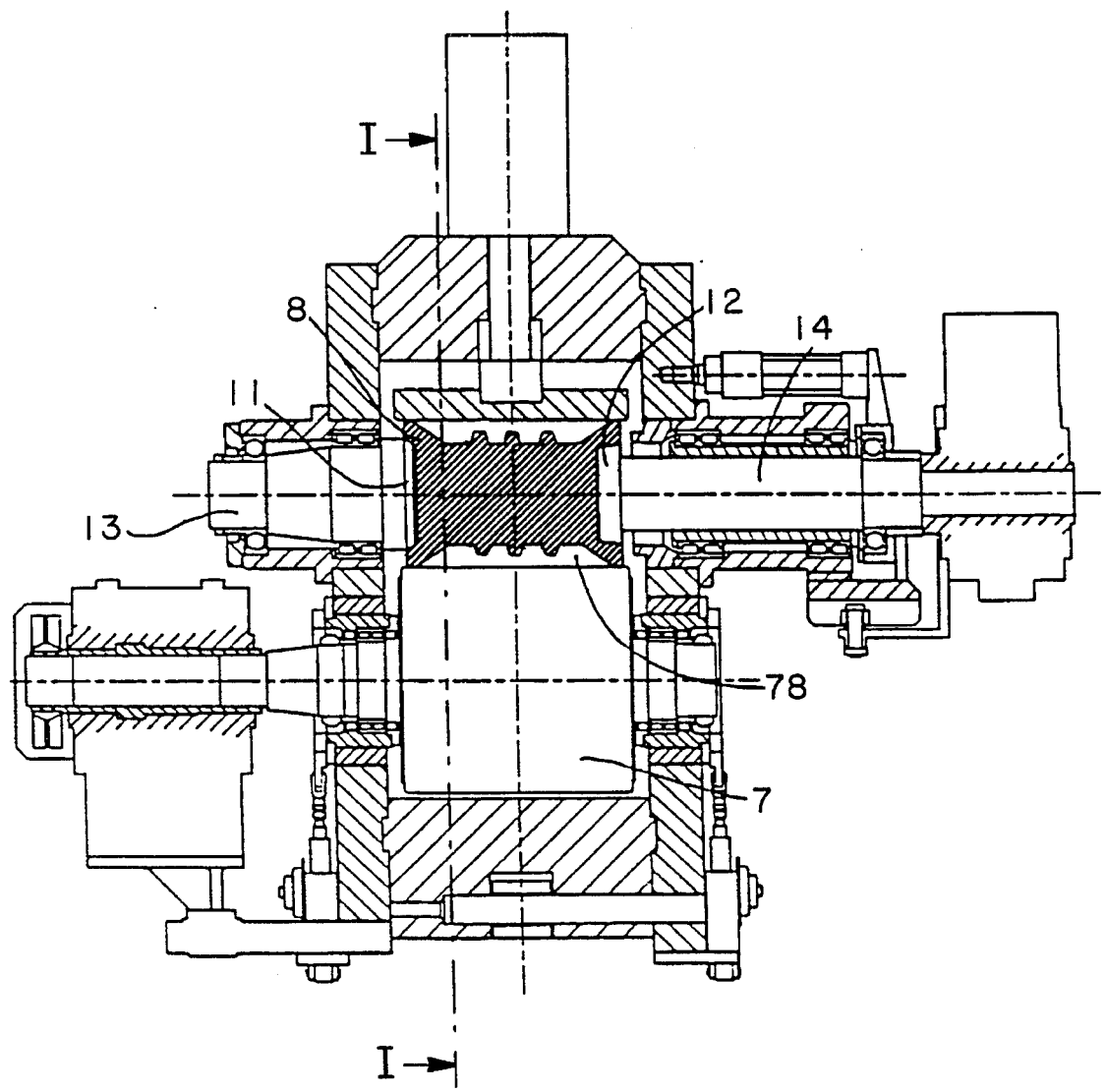
FIG. 2 is a section along the line II—II of FIG. 1.
Figure 4:
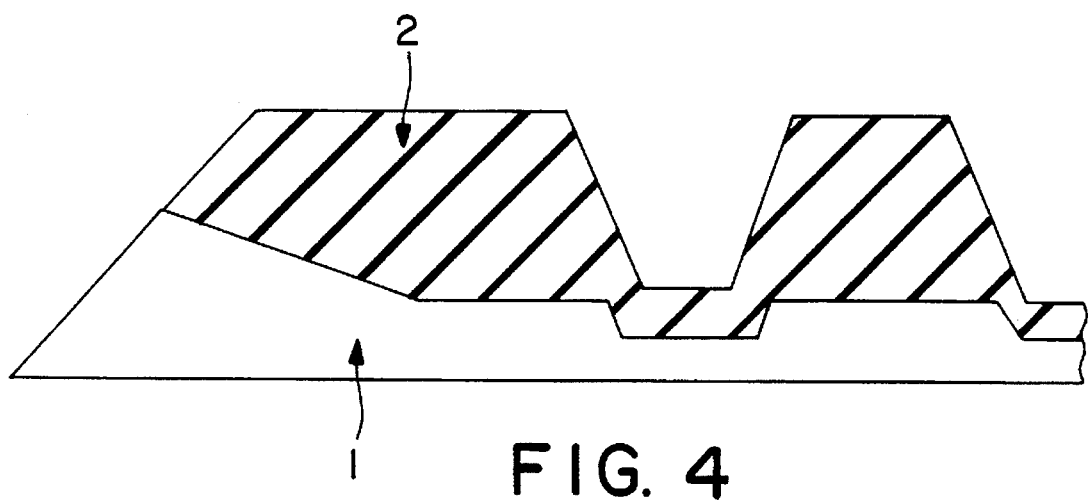
FIG. 4 is a section showing the final composite product.

The carrying out of the invention therefore consists in effecting two simple roller die extrusions and in arranging the rollers 7 and 8 in such a manner that one can effect a hot doubling of the extruded mixes immediately downstream of their points of extrusion and before the extruded mixes leave contact with the rotary rollers. This doubling takes place in the space or passage 78 located between the rollers 7 and 8 (see FIG. 2). The final product is shown in FIG. 4.

This makes it possible to assure a very great uniformity and very great precision of the extruded products. The use of the invention is of very particular interest when the mixes used are of a very different nature. As a matter of fact, no dispersion or fluctuation of the line of separation between rubbers of very different properties is noted, contrary to what could be observed when using co-extrusion techniques.

Figure 5:
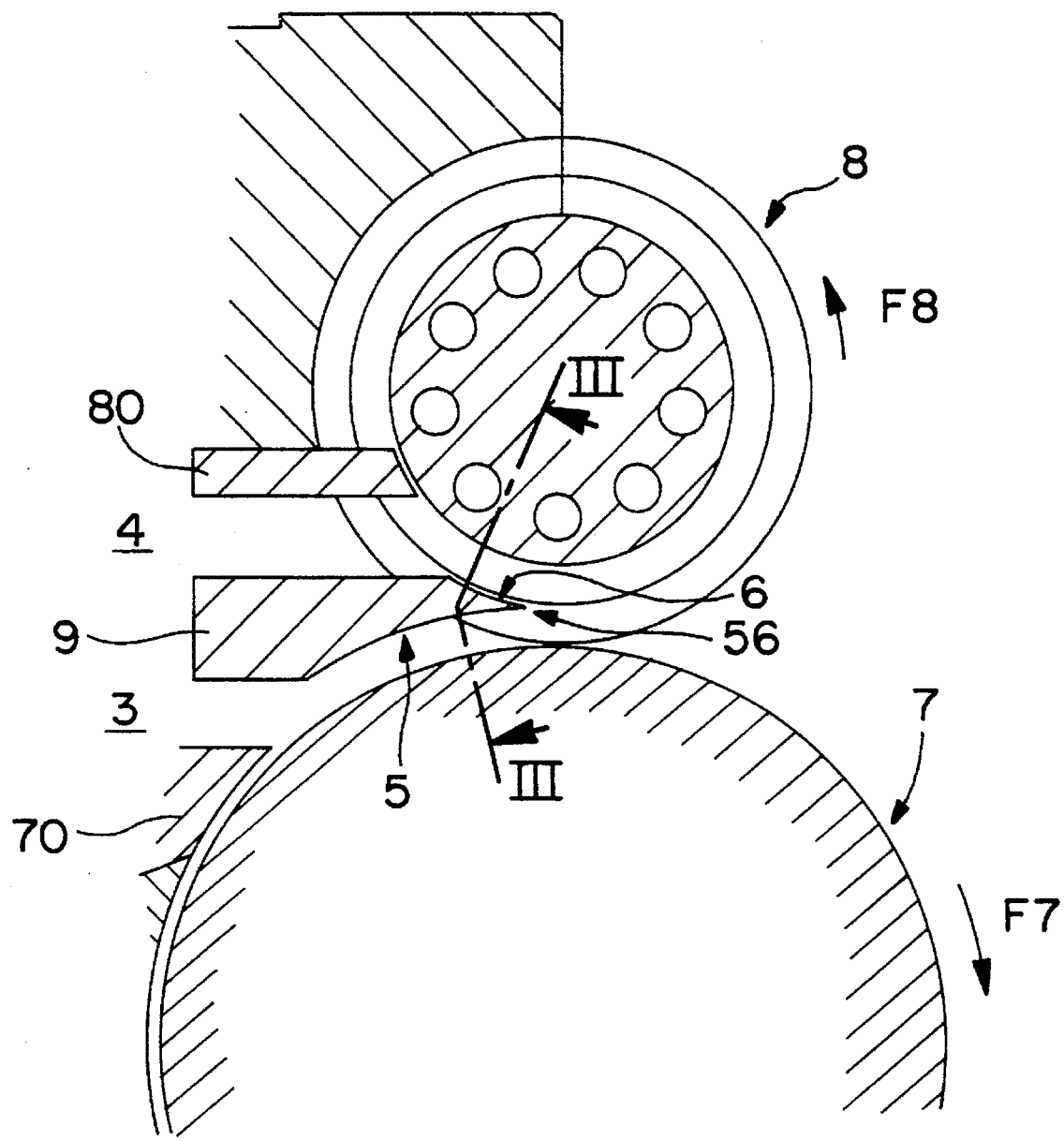
FIG. 5 is an enlarged view of a part of FIG. 1.

In accordance with one embodiment of the invention, the stationary wall 5 associated with the cylindrical roller 7 and the fixed wall 6 associated with the profiled roller 8 are developed on one and the same part 9 (see FIG. 5), which constitutes a tool which it is necessary to change whenever the profiled composite product to be manufactured is changed. In FIG. 5 it can also be seen that, on the upstream side with respect to the directions of rotation of the rollers 7 and 8, indicated by the arrows F7 and F8, two sealing inserts 70 and 80 are arranged in order to avoid mixture flow over the rotary rollers, under the effect of the delivery pressure of the extruders, in the direction opposite to the direction of rotation. The sealing insert 80 corresponds in shape to the surface of the profiled roller 8. It is therefore a tool which is associated with this profiled roller 8; it is changed at the same time as the profiled roller.

In order to facilitate the change thereof, the profiled roller 8 is gripped between two conical sleeves 11 and 12. The conical sleeve 11 is part of a freely rotating rotary support 13. The conical sleeve 12 is arranged at the end of the transmission shaft 14, which can move back axially to free the profiled roller 8.

Another advantage of the invention over the roller die co-extrusion technique is that the development of the tools specific for each profiled rubber product is extremely simple. Due to the possibilities of regulating the speed of each of the two rollers, it is in fact possible to achieve good precision and good uniformity of manufacture without having to optimize the exact shape of the surface of the profiled roller and of the fixed walls 5 and 6. The regulation is based on the use of at least one pressure probe (not shown), arranged in the die of the extruder in question, making it possible to regulate the rate of flow of the extruder 3 or 4 and the speed of the corresponding roller 7 or 8.

The fixed walls 5 and 6 preferably intersect and the intersection 56 of the complementary profiles of these fixed walls is arranged substantially at the height of the plane joining the axes of rotation of the two rollers 7 and 8. The walls 5 and 6 are preferably surfaces of revolution, centered approximately on the axis of rotation of the associated roller 7 or 8. This has the result that each wall 5 or 6 is spaced from the surface of the associated roller by a substantially constant amount for every circumferential position along the said wall.

Summarizing, each of the two rubber mixes delivered by its extruder is first of all shaped and applied onto one of the two rollers to which it adheres. The joining of the two partial profiles takes place between the two rollers.

I claim:

1. An extrusion apparatus for manufacturing a product formed of different mixes of raw rubber, comprising a first rotary roller, a second profiled rotary roller, the profiled roller being adjacent the first roller, the axes of rotation of the rollers being parallel so as to define between them a passage section for the rubber, and means for conveying the different mixes into said passage section, said means including a first extruder delivering a first rubber mix through an extruder orifice which has a fixed profiled wall cooperating with the first rotary roller to bring the first mix into engagement with the first rotary roller upstream of said passage section and to impart the profile of the fixed wall to the surface of the first rubber mix which profile defines a line of separation between the different mixes, and a second extruder delivering a second rubber mix through an extruder orifice which has a fixed profiled wall cooperating with the second rotary roller to bring the second mix into engagement with the second rotary roller upstream of said passage section and to impart the profile of the fixed wall to the surface of the second rubber mix which profile defines the line of separation between the mixes, and means to form the final profiled product being formed by the superimposing of the mixes in the passage between the rollers.

2. An apparatus according to claim 1, characterized by the fact that the profile of the fixed wall which cooperates with the profiled roller is of a shape complementary to the profile of the fixed wall which cooperates with the first roller.

3. An apparatus according to claim 1, characterized by the fact that said fixed walls intersect.

4. An apparatus according to claim 1, characterized by the fact that said fixed walls are developed on one and the same part.

5. An apparatus according to claim 1, characterized by the fact that the first roller is cylindrical.

6. An apparatus according to claim 1, characterized by the fact that each fixed wall is spaced from the surface of the associated roller by an amount which is substantially constant for every circumferential position along the said wall.

7. An apparatus according to claim 1, characterized by the fact that it comprises at least one pressure probe which makes it possible to regulate the rate of flow of an extruder and the speed of the corresponding roller.

8. A method of extrusion for forming a profiled composite product formed of at least two different rubber mixes arranged on opposite sides of at least one line of separation, comprising applying by extruding onto a first rotary roller a first mix having a surface with a profile which includes the profile of the line of separation, applying by extruding onto a second profiled rotary roller a second rubber mix having a surface with a profile which includes the profile of the line of separation, the axes of rotation of the rollers being parallel so as to define between them a downstream passage section for the rubber, the respective rollers conveying the mixes through said downstream passage section profile defined between the rollers, superimposing the profiled first and second rubber mixes at said downstream passage between the rollers where they are carried by their respective rollers, and imparting the profile of the passage to the exterior of the composite product emerging between the rotary rollers.

9. A method according to claim 8, characterized by the fact that the first roller is cylindrical.

* * * * *

UNITED STATES PATENT AND TRADEMARK OFFICE
CERTIFICATE OF CORRECTION

PATENT NO.   : 5,453,238
DATED        : Sept. 26, 1995
INVENTOR(S)  : Daniel Bardy It is certified that error appears in the above-indentified patent and that said Letters Patent is hereby corrected as shown below:

Col. 5, line 8, "product being formed" should read --product--; and

Col. 6, line 15, "section profile" should read --section--.

Signed and Sealed this

Sixteenth Day of January, 1996

Attest:

BRUCE LEHMAN

Attesting Officer    Commissioner of Patents and Trademarks